(12) United States Patent
Turner

(10) Patent No.: US 10,378,678 B2
(45) Date of Patent: Aug. 13, 2019

(54) PLASTIC VOID CONSTRUCTION UNIT

(71) Applicant: Void Form Products, Inc., Englewood, CO (US)

(72) Inventor: Michael L. Turner, Fort Worth, TX (US)

(*) Notice: Subject to any disclaimer, the term of this patent is extended or adjusted under 35 U.S.C. 154(b) by 0 days.

(21) Appl. No.: 16/186,224

(22) Filed: Nov. 9, 2018

(65) Prior Publication Data

US 2019/0086001 A1  Mar. 21, 2019

Related U.S. Application Data

(63) Continuation-in-part of application No. 15/441,099, filed on Feb. 23, 2017, now Pat. No. 10,267,012.

(Continued)

(51) Int. Cl.
*E02D 29/00* (2006.01)
*E02B 9/06* (2006.01)
(Continued)

(52) U.S. Cl.
CPC .............. *F16L 1/028* (2013.01); *E02D 29/10* (2013.01); *F16L 3/1218* (2013.01); *F16L 3/14* (2013.01);
(Continued)

(58) Field of Classification Search
CPC ..... E02D 29/02; E02D 29/0225; E02D 17/08; E02D 17/086; E02D 5/02; E02D 5/04; E02D 5/08; E02D 5/10; E02D 5/14; E02D 17/00; E02D 29/0216; F16L 1/11; F16L 1/123; H02G 9/025; A63H 33/10; A63H 33/101; A63H 33/107; A63H 33/108; A63H 33/12; E04B 1/34321; E04B 1/48; E04B 1/00; E04B 2/7405
USPC ...... 52/239, 601, 781, 309.12, 309.4, 309.9, 52/309.17, 806, 807, 778, 582.1, 79.1, 52/127.7; 428/53, 73, 119, 209, 248, 428/703, 116; 405/262, 189, 157, 405/272–285; 256/19; 446/85, 86, 87,
(Continued)

(56) References Cited

U.S. PATENT DOCUMENTS 2,593,714 A * 4/1952 Robinson ................ B29C 49/44
144/348
3,381,483 A * 5/1968 Huthsing, Jr. .......... E02B 3/066
405/262

(Continued)

*Primary Examiner* — Benjamin F Fiorello
*Assistant Examiner* — Edwin J Toledo-Duran
(74) *Attorney, Agent, or Firm* — Law Office of Jeff Williams PLLC; J. Oliver Williams

(57) ABSTRACT

A device and method for the creation of a water proof component void form unit to create space between concrete structures and expansive soil for the passage of utility conduit lines is described. The unit includes a plurality of panels interlocked with one or more connectors and supports that pass internally through flutes within the panel members. The void space is formed from a singular panel that is scored along a score line. The score line passes only through an upper surface. The panel member is folded about the lower surface at the score line to form the void space. The panels are located in a trench and configured to define a void space underground for the passage of the utility conduit lines. The unit is configured to resist soil expansive forces so as to protect the placement and integrity of the utility conduit lines.

18 Claims, 14 Drawing Sheets

Related U.S. Application Data

(60) Provisional application No. 62/584,049, filed on Nov. 9, 2017, provisional application No. 62/298,769, filed on Feb. 23, 2016.

(51) Int. Cl.
| | |
|---|---|
| *F16L 1/028* | (2006.01) |
| *F16L 3/14* | (2006.01) |
| *F16L 3/12* | (2006.01) |
| *H02G 9/08* | (2006.01) |
| *H02G 9/06* | (2006.01) |
| *F16L 57/02* | (2006.01) |
| *H02G 3/38* | (2006.01) |
| *F16L 1/11* | (2006.01) |

(52) U.S. Cl.
CPC ............ *F16L 57/02* (2013.01); *H02G 3/383* (2013.01); *H02G 9/06* (2013.01); *H02G 9/08* (2013.01); *F16L 1/11* (2013.01)

(58) Field of Classification Search
USPC ........ 446/105, 107, 108, 109, 110, 111, 112, 446/113, 114, 115, 116, 122
See application file for complete search history.

(56) References Cited

U.S. PATENT DOCUMENTS

| | | | | |
|---|---|---|---|---|
| 3,564,785 A * | 2/1971 | Kephart | ............ | E04B 1/14 52/105 |
| 3,886,705 A * | 6/1975 | Cornland | ............ | E04B 1/6179 52/536 |
| 3,999,394 A * | 12/1976 | Eberhardt | ............ | E02D 29/05 405/149 |
| 4,005,582 A * | 2/1977 | Tamaro | ............ | E02D 5/20 405/267 |
| 4,035,964 A * | 7/1977 | Robinson | ............ | E04B 1/3445 217/14 |
| 4,055,927 A * | 11/1977 | Tamaro | ............ | E02D 5/20 264/35 |
| 4,139,142 A * | 2/1979 | Maple | ............ | F16L 3/16 228/175 |
| 4,212,130 A * | 7/1980 | Walker | ............ | A63H 33/008 446/111 |
| 4,266,745 A * | 5/1981 | Jones | ............ | F16L 3/14 248/58 |
| 4,608,799 A * | 9/1986 | Hasegawa | ............ | A63H 33/10 446/112 |
| 4,697,955 A * | 10/1987 | Le Clerco | ............ | E02D 29/045 405/135 |
| 5,056,242 A * | 10/1991 | Miotti | ............ | E02D 17/13 37/195 |
| 5,259,705 A * | 11/1993 | Breaux | ............ | B09B 1/008 405/129.8 |
| 5,305,568 A * | 4/1994 | Beckerman | ............ | B32B 3/00 52/309.4 |
| 5,354,149 A * | 10/1994 | Breaux | ............ | B09B 1/008 405/129.6 |
| 5,862,624 A * | 1/1999 | Askins | ............ | A01M 23/18 43/58 |
| 6,224,296 B1 * | 5/2001 | Fukumori | ............ | E02D 17/08 405/272 |
| 6,243,992 B1 * | 6/2001 | Gyllenhammar | ............ | B60P 3/34 296/26.05 |
| 6,485,647 B1 * | 11/2002 | Potts | ............ | C02F 3/288 210/150 |
| 6,557,805 B1 * | 5/2003 | Snyder | ............ | F16L 3/137 248/60 |
| 6,901,710 B1 * | 6/2005 | Cooper | ............ | B29C 70/52 52/265 |
| 7,243,897 B2 * | 7/2007 | Huber | ............ | E02D 27/01 249/216 |
| 8,919,704 B2 * | 12/2014 | Lee | ............ | F16L 3/26 248/58 |
| 9,163,393 B2 * | 10/2015 | Carroll | ............ | E04H 1/00 |
| 2002/0076280 A1 * | 6/2002 | Semotiuk | ............ | E01F 5/005 405/124 |
| 2004/0194396 A1 * | 10/2004 | Shanni | ............ | E04B 1/3442 52/79.5 |
| 2005/0023432 A1 * | 2/2005 | Huber | ............ | E02D 27/01 249/34 |
| 2006/0265949 A1 * | 11/2006 | Hiddema | ............ | A01G 9/16 47/17 |
| 2007/0193192 A1 * | 8/2007 | Huber | ............ | E02D 27/02 52/698 |
| 2012/0304549 A1 * | 12/2012 | Rutledge | ............ | E04B 1/34315 52/16 |
| 2013/0014458 A1 * | 1/2013 | Boydstun, IV | ............ | E04G 9/065 52/274 |
| 2014/0212219 A1 * | 7/2014 | Jowett | ............ | E03F 1/003 405/36 |
| 2015/0135566 A1 * | 5/2015 | Simmons | ............ | G09F 1/06 40/124.08 |
| 2015/0259897 A1 * | 9/2015 | Carroll | ............ | E04H 1/00 52/582.1 |

* cited by examiner

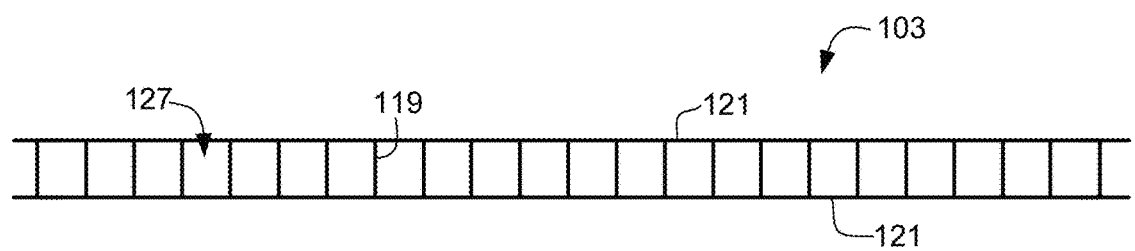
FIG. 6
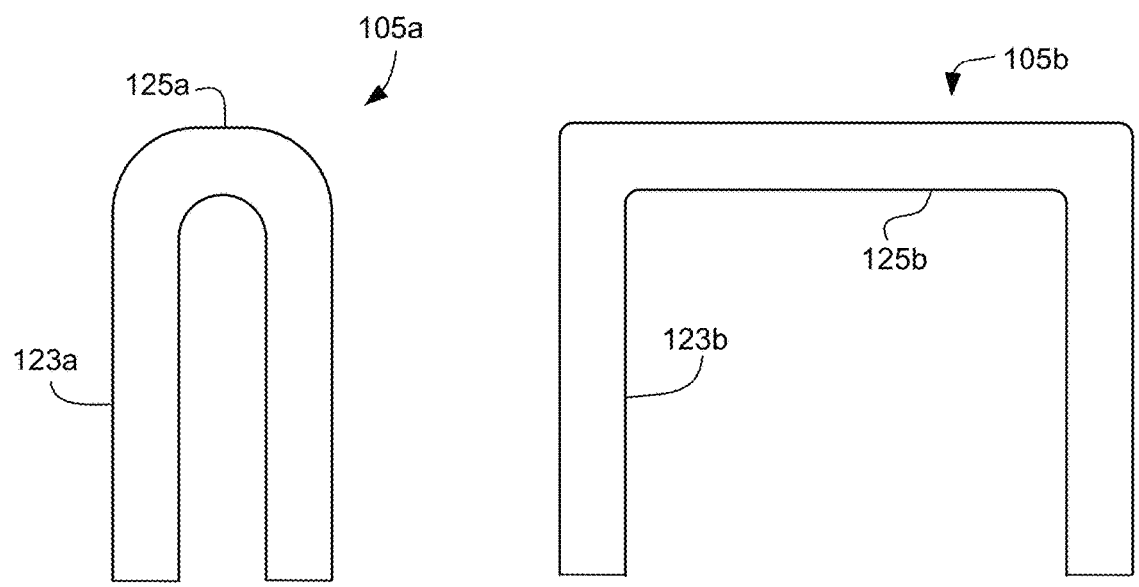
FIG. 7A
FIG. 7B

PLASTIC VOID CONSTRUCTION UNIT

CLAIM OF PRIORITY

This application claims the benefit of U.S. Provisional Application No. 62/584,049, filed 9 Nov. 2017. This application is a continuation-in-part application of pending U.S. Nonprovisional application Ser. No. 15/441,099, filed 23 Feb. 2017 which claims priority to U.S. Provisional Application No. 62/298,769, filed 23 Feb. 2016. The information contained therein is hereby incorporated by reference.

BACKGROUND

1. Field of the Invention

The present application relates generally to construction products, and in particular to an apparatus for a water proof component void form, formed from a single sheet member, to create space between concrete structures and expansive soil for the passage of plumbing lines, electrical lines and other utility conduit lines.

2. Description of Related Art

A plurality of structures are built on and in expansive soils. Most buildings require one or more plumbing lines to provide clean water and remove waste water. Unprotected plumbing lines in the ground are subject to stresses from expansive soil. Often the stresses are great enough to break the pipes, push plumbing lines through the slab, damage other plumbing apparatuses or even cause damage to adjacent structures. Once this occurs, the lines leak and can cause excessive saturation under a foundation. This saturation may lead to foundation cracking and further soil expansion. It is often desired to isolate plumbing lines from direct contact with expansive soil in order to minimize potential damages. This is not always easy.

A few different types of methods have been developed. For example, one type of method involves the use of a metal wire mesh formed into a volumetric shape. The idea being that as the soil pushes on the wire mesh, the mesh will deform or the soil will push through the mesh. While in theory this may work, it is often not feasible and has many disadvantages. Metal cages are difficult to manipulate and contour to the path of the plumbing. Additionally, cutting and shaping the mesh can be very difficult and time consuming. Cut wires are sharp and can lead to injuries. Likewise, soil passes easily through the gaps in the mesh.

Although great strides have been made with respect to protecting underground plumbing lines from expansive soil, considerable shortcomings remain. A new type of system is needed that prevents damage to buildings, plumbing lines and other conduit from soil expansion.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 3-22 are exemplary perspective views illustrating the method of construction of the plumbing void construction unit of FIG. 1.

Figure 1:
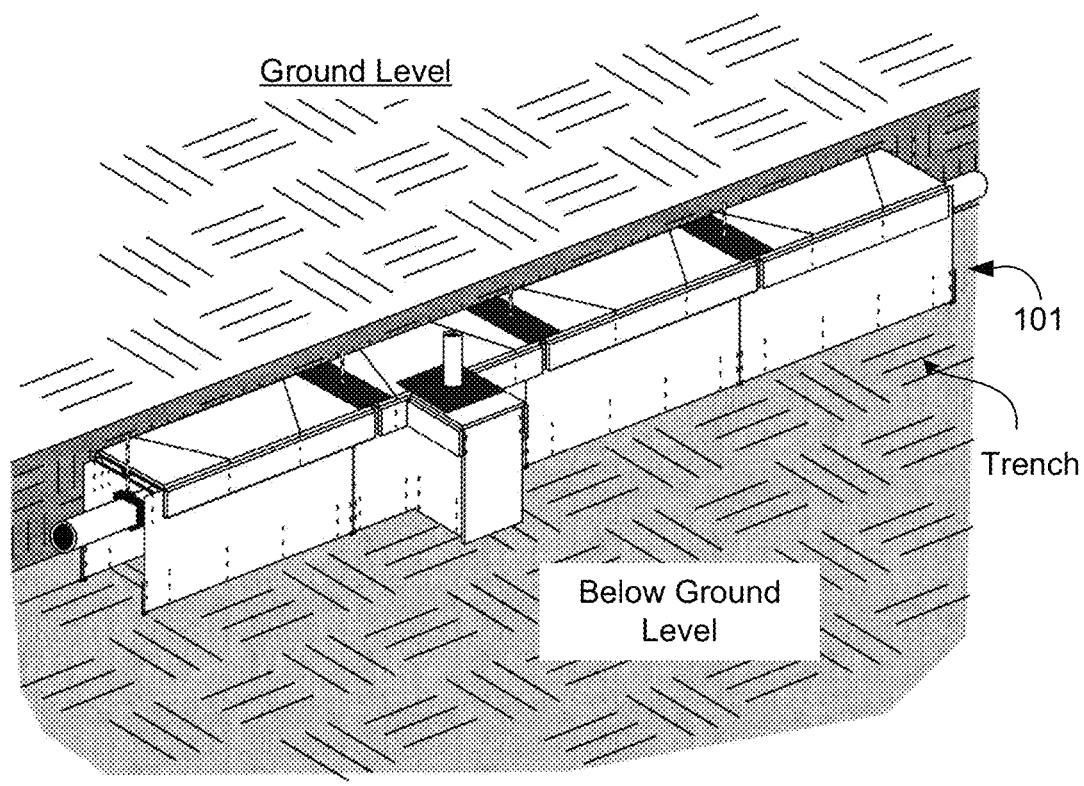
FIG. 1 is a perspective view of a plumbing void construction unit according to an embodiment of the present application.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The apparatus and method in accordance with the present application overcomes one or more of the above-discussed problems commonly associated with underground plumbing lines, electrical lines and other conduit. Specifically, the unit of the present application is configured to eliminate costly damage to buildings and broken plumbing under, and above, concrete slabs due to the effects of expansive soil. In particular, the unit of the present application is configured to provide a void space within the ground that is formed from a single panel member scored along selected surfaces to produce a desired shape and size. The unit of the present application is configured to provide temporary support to under-slab plumbing and suspend lateral pipes in a protected containment void area. The unit is easily customizable and can adjust to changes in plumbing routes. These and other unique features of the device are discussed below and illustrated in the accompanying drawings.

The apparatus and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The apparatus of the present application includes a unit having a plurality of members that when used in combination, creates a self-contained void space for the safe routing of plumbing lines, electrical lines and other conduit underground. In one embodiment the unit includes a plurality of selectively arrayed panel sections coupled together to form a routing path. In a secondary embodiment the routing of the void space is formed from the scoring of single panel members along a top surface to form the desired shape. Neighboring panel sections are supported with a plurality of braces/connectors for stability. Additional panels may be added over the top of the panel sections so as to enclose the space and seal gaps between panel sections. Pipe is laid within the space and elevated as necessary to ensure proper drainage. Elevation is secured through the use of a clevis bracket and threaded rod configured to extend out through the space and panel sections. A fastener and washer combination is used to provide temporary support for the pipe, being supported by the braces/connectors. By modifying the panel sections, routes may be customized to accommodate plumbing needs. Additional features and functions of the device are illustrated and discussed below.

Referring now to the drawings wherein like reference characters identify corresponding or similar elements in form and function throughout the several views. FIG. 1 illustrates a sample configuration for a plumbing void construction unit 101 according to the present application. Unit 101 is depicted below ground level within a trench, wherein the wall of the trench closest in the view is removed for clarity purposes. Unit 101 is configured to provide a modular and fully customizable routing void space below ground level in which to run any number of utility lines, such as plumbing lines, electrical lines, gas lines and so forth. Unit 101 is configured to provide a fully enclosed space designed to withstand soil pressures. Unit 101 is also configured to protect the utility lines from expansive soil movements.

Figure 2:
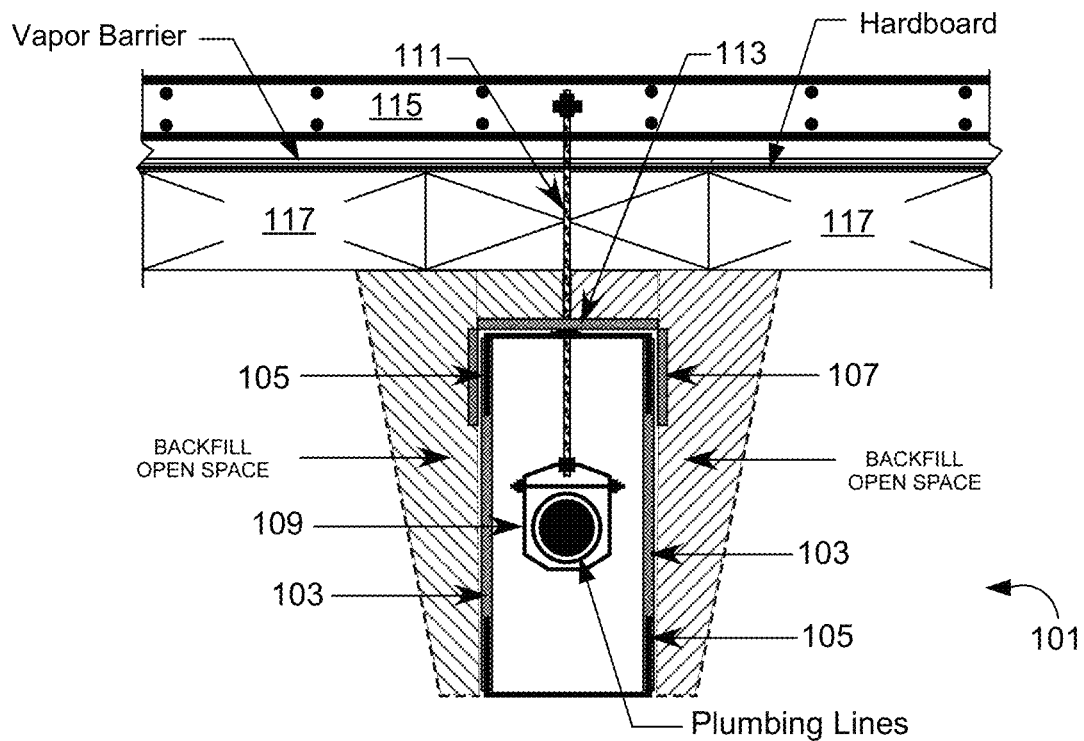
FIG. 2 is an exemplary front view looking down the length of the plumbing void construction unit of FIG. 1 in finished form.

Referring now also to FIG. 2 in the drawings, a front view looking down the length of unit 101 is illustrated. Unit 101 includes a plurality of side panels 103 coupled together through one or more braces/connectors 105. The combination of panels 103 in communication with one another form a channel for the laying of piping. It is understood that any type of lines may be run within the void space generated by unit 101. For purposes of explanation, reference will be given to that of plumbing lines and associated piping. Unit 101 further includes a top cap configured to overlap the side panels and enclose the void space from the backfill and soil. The side panels 103 and top cap 107 are configured to resist inward movement of the soil into the void space.

As seen in FIG. 2, unit 101 is located within the ground and surrounded by backfill or soil when fully assembled. Initially unit 101 is located within a trench for assembly purposes. A hanger 109 and rod 111 are also shown for supporting the plumbing lines. Unit 101 may further include fastener system 113 to provide support for hanger 109 and rod 111 prior to being fully secured by the substrate above ground. The other depicted portions of FIG. 2 illustrate contextual references and show an exemplary manner in which unit 101 may be utilized in a more specific application. As seen, unit 101 is located within the ground and rod 111 protrudes forth out of the ground into a substrate 115 such as concrete. A void producing structure 117 may be utilized between the substrate and the ground.

Figure 3:
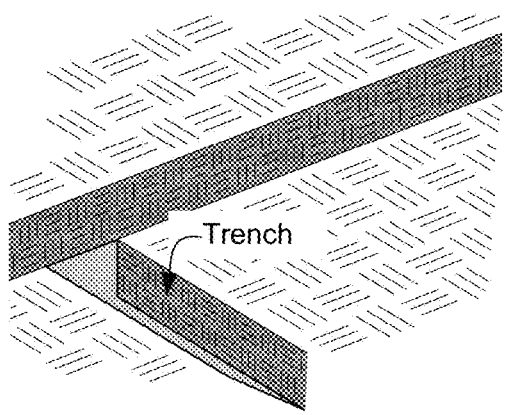

Referring now also to FIGS. 3-22 in the drawings, the method of use and components of unit 101 are illustrated. As stated previously, unit 101 is configured to create and maintain a contained void space separating underground plumbing lines, electrical lines and other conduit from expansive soil which may cause damage to the lines and adjacent structures. Unit 101 temporarily provides support for under-slab plumbing by suspending them off the ground. A void space area is provided in which expansive soils may expand without damaging plumbing lines. As seen in FIG. 1, unit 101 is located in a trench (see also FIG. 3) and is used to surround the plumbing lines. The inner wall of the trench is not show in order to visually display unit 101 (see FIGS. 4-20). The sequential alignment of panels 103 are shown. It is understood that the various members and parts of unit 101 are customizable to permit routing having any number of bends, changes in elevation, and more than one plumbing pipe, electrical line or conduit contained within. It is recommended that the trench be wider than the necessary void space area in order to have room for adjusting the sections when needed. This also applies to the depth of the trench in the case that a granular material is selected as a bottom layer.

Figure 4:
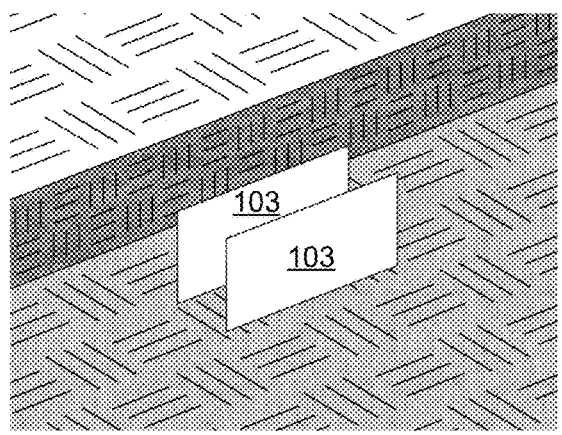

In FIG. 4 two side panels 103 are illustrated within the trench. The panels 103 are placed at the base of the trench and are located in a side by side manner being separated by a gap. The gap is determined by the needed spacing requirements of the project these are used in conjunction for. Gap distances could be 24 inches or 18 inches for example. Panels 103 can be manufactured and used in various manners and forms. A top view of panel 103 is illustrated in FIG. 6. As seen, panel 103 is preferably formed as a ribbed plastic panel. The plastic material has perpendicular supports 119 connecting the exterior surfaces/faces 121 in order to form a supportive sheet/panel. Ideally, panel 103 is a solid member without perforations or holes along its main surfaces 121. This prevents soil from passing through the panel. A conceivable material would be polypropylene plastic. Panels 103 may be found in different sizing. A common sizing may be that of: height approximately 18" to 36"; width approximately 12" to 24"; and length approximately 48" for example. In these depictions, panels 103 are parallel to one another. It is understood that some instances may necessitate the angling of the panels 103 in a non-parallel orientation.

Figure 5:
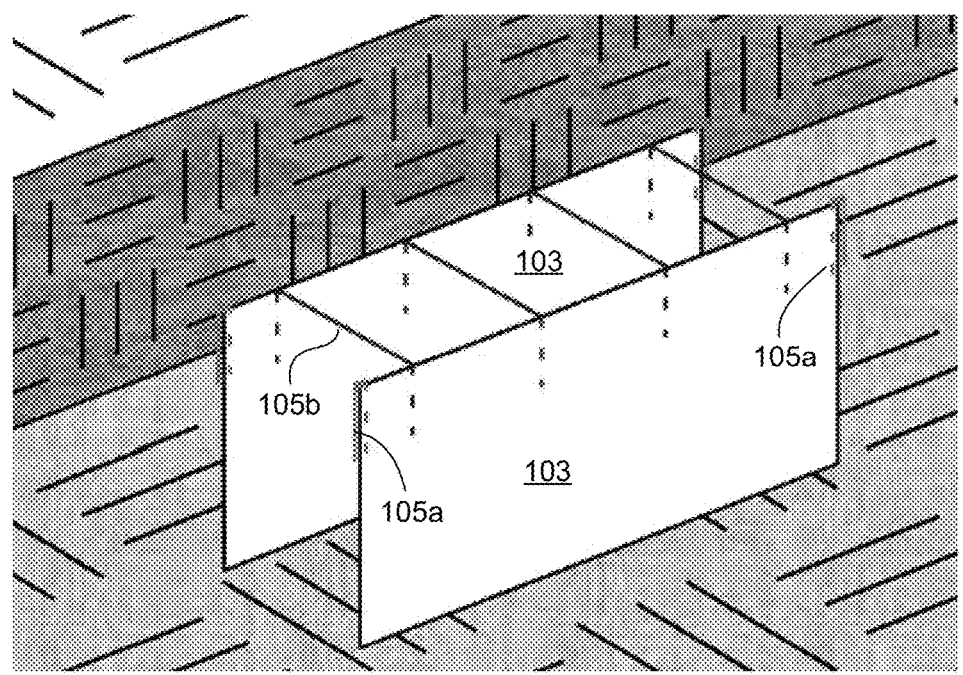

Panels 103 are coupled together via connectors 105. Connectors 105 are configured to interlock the plurality of panels 103 together. Panels 103 will be aligned opposite one another, as seen in FIGS. 4 and 5, and also in an abutting fashion along the same relative line, as seen starting in FIG. 9. Therefore connectors 105 are used to couple panels 103 together in both situations. Connectors 105 can be seen in communication with panels 103 in FIG. 5.

FIGS. 7A and 7B illustrated two basic types of connectors 105. Connector 105a is illustrated in FIG. 7A. Connector 105b is illustrated in FIG. 7B. Each connector has a plurality of legs 123a/b and a bridge portion 125a/b. Bridge portion 125a/b is configured to extend between legs 123a/b. Its length may be any that is necessary to accommodate the spacing of panels 103. In particular, connector 105a is configured to couple abutting panels 103. Given that these panels abut one another, bridge portion 125a is relatively small and almost insignificant. Connector 105b is configured to extend between opposing panels across from one another and provide lateral support from the forces incurred through soil expansion. In this instance, bridge portion 125b is lengthened accordingly. Both types of connectors are seen in FIG. 5. It is important to note that legs 123a/b are configured and sized so as to translate within slots 127 (see FIG. 6) formed between surfaces 121 and supports 119. Other manners of coupling are considered, and in no way are connectors 105 limited to this particular manner of coupling. An example of connectors 105 could be rebar selectively bent, cut, and/or welded into shape.

Figure 8:
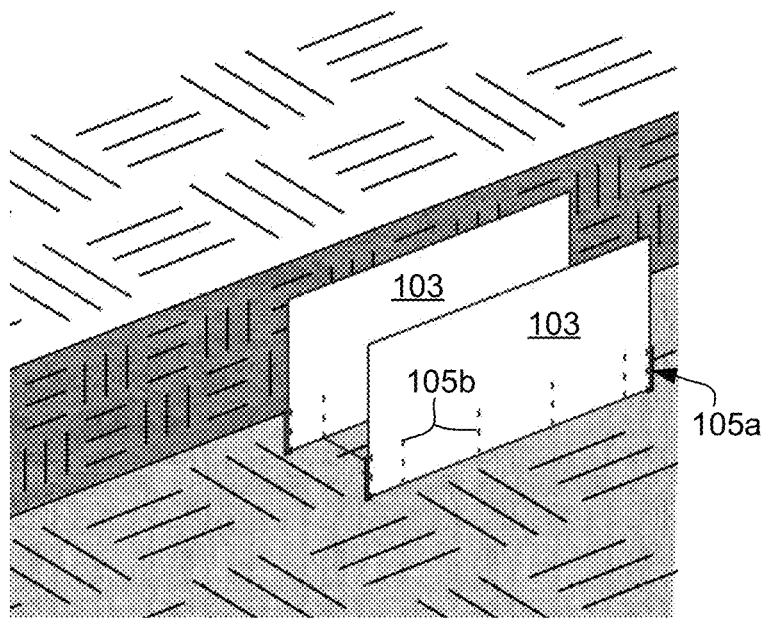
Figure 9:
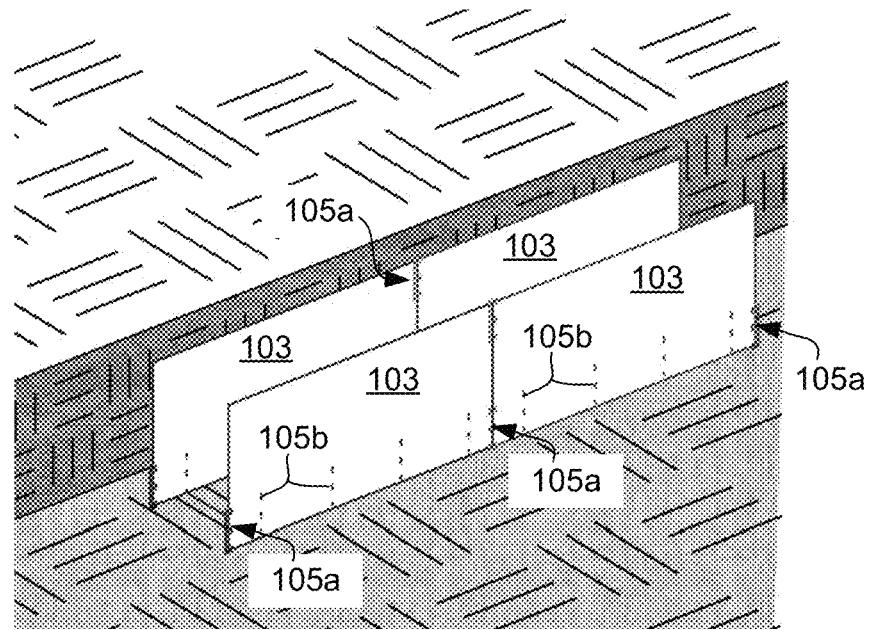

In FIG. 8, the connected section of panels 103 shown in FIG. 5 is flipped over and aligned within the trench. An advantage of unit 101 is that it is ideally suited for simplified and easy construction, and can adapt to any routing configurations. In the flipped orientation, connectors 105 are located along the bottom of the panel sections. The constructing of them first with the connectors at the top and then flipping it over is found to be the simplest manner of construction. In FIG. 9, a second panel section unit is constructed and connected to the first panel section unit. The second unit abuts the first panel section unit. These panel sections are coupled to corresponding connectors 105a, both at the top and the bottom at this stage of construction so as to maintain their relative alignment during the remaining construction process. This same process is applicable for the constructing of all other panel sections.

Figure 10:
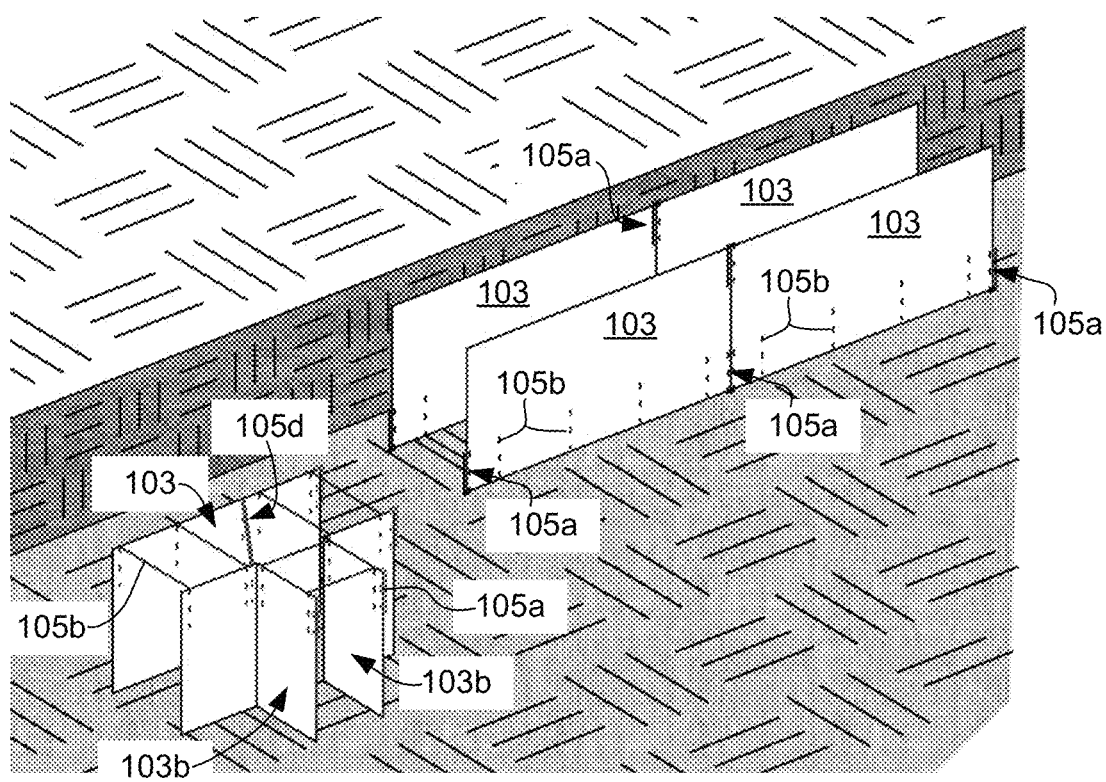
Figure 11:
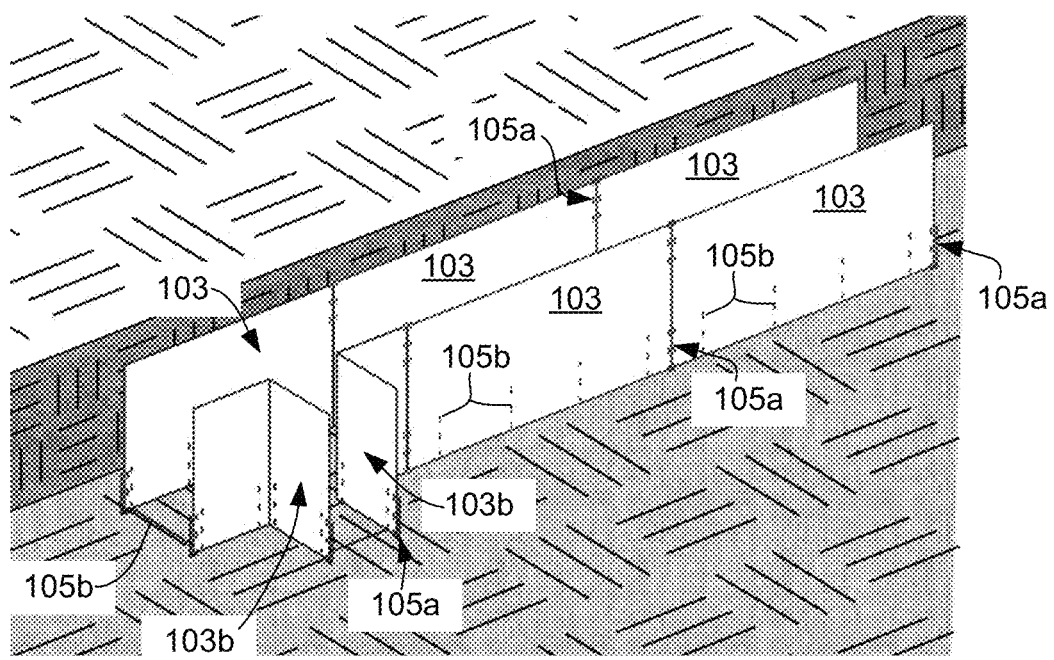

As stated previously, panels 103 are configured to adapt to different routing paths, where the paths do not necessarily follow a straight line. FIGS. 10 and 11 illustrates a panel section that incorporates a "T" in the routing. Panel 103 is configured to accept scoring along surfaces 121. When scored along the slots 127 of the ribbing through only a single face 121, the remaining face 121 acts as a pivot point or folding joint to allow the face 121 to be angled as desired. In the depicted example, the face is oriented to form a perpendicular routing. Corresponding panels 103b are found opposite each other at the "T" intersection.

Figure 12:
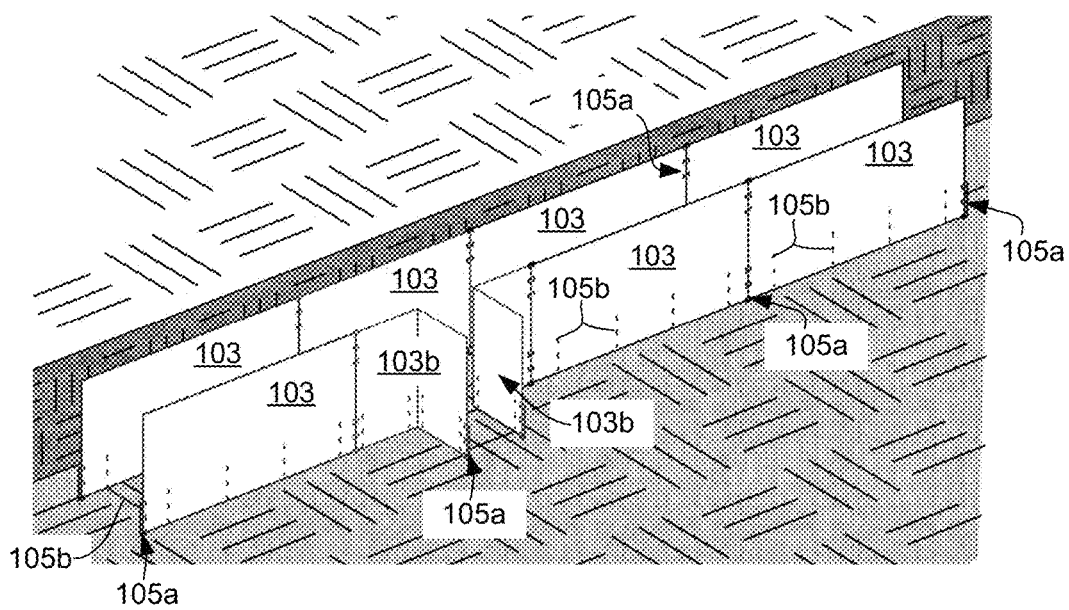
Figure 13:
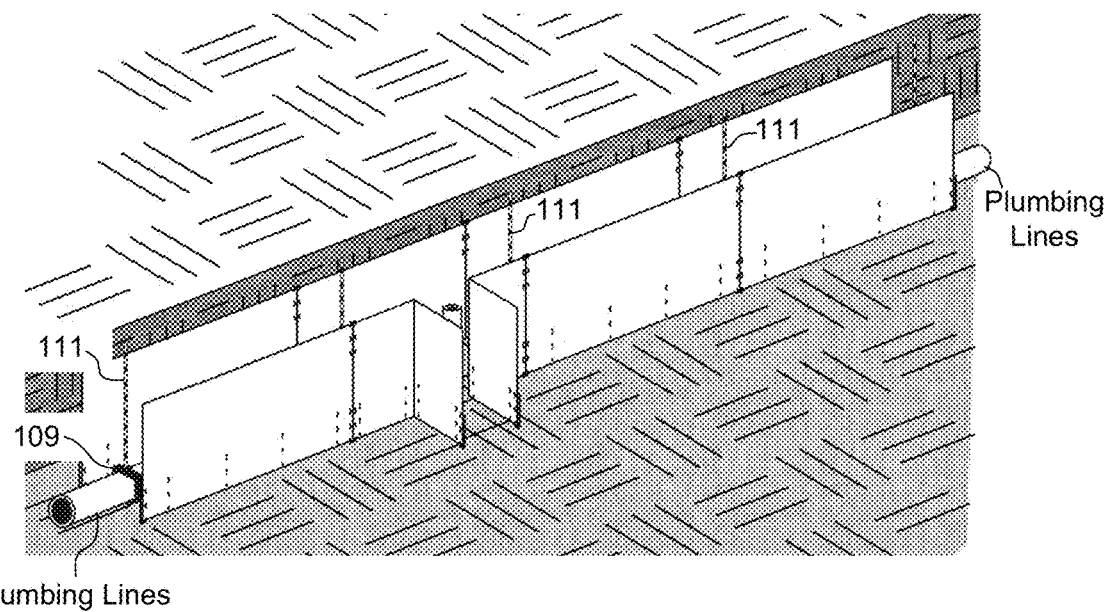
Figure 14:
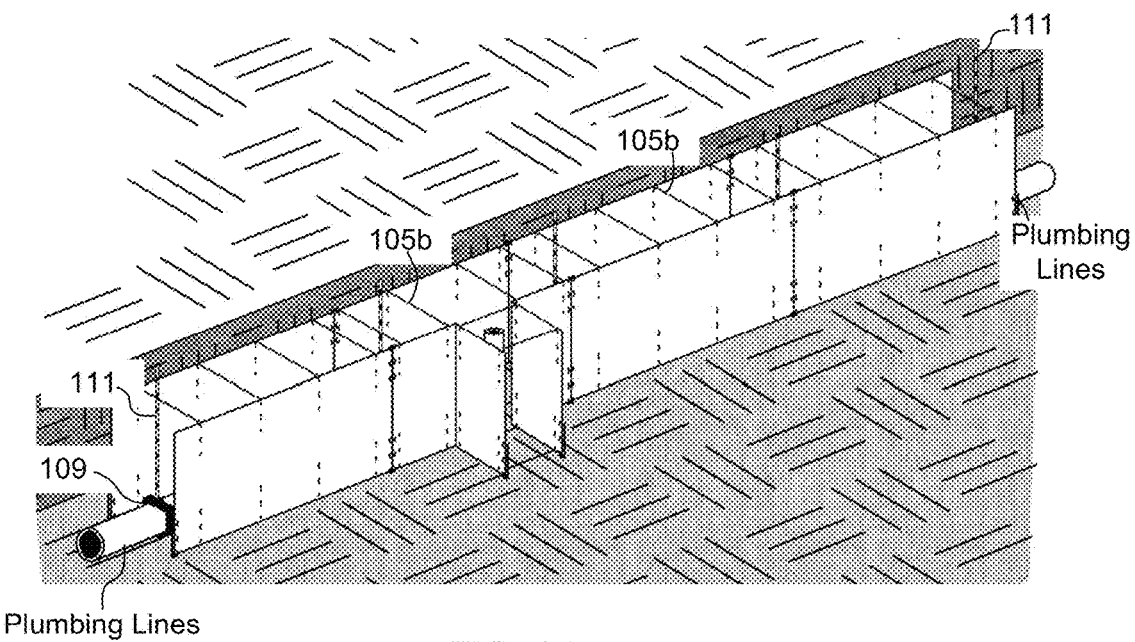
Figure 15:
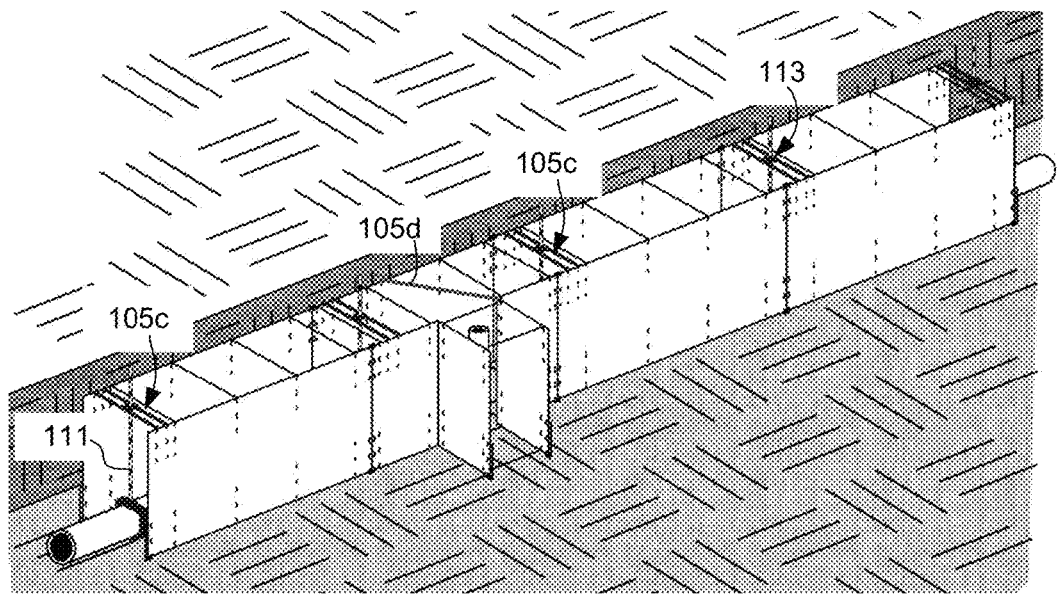
Figure 16:
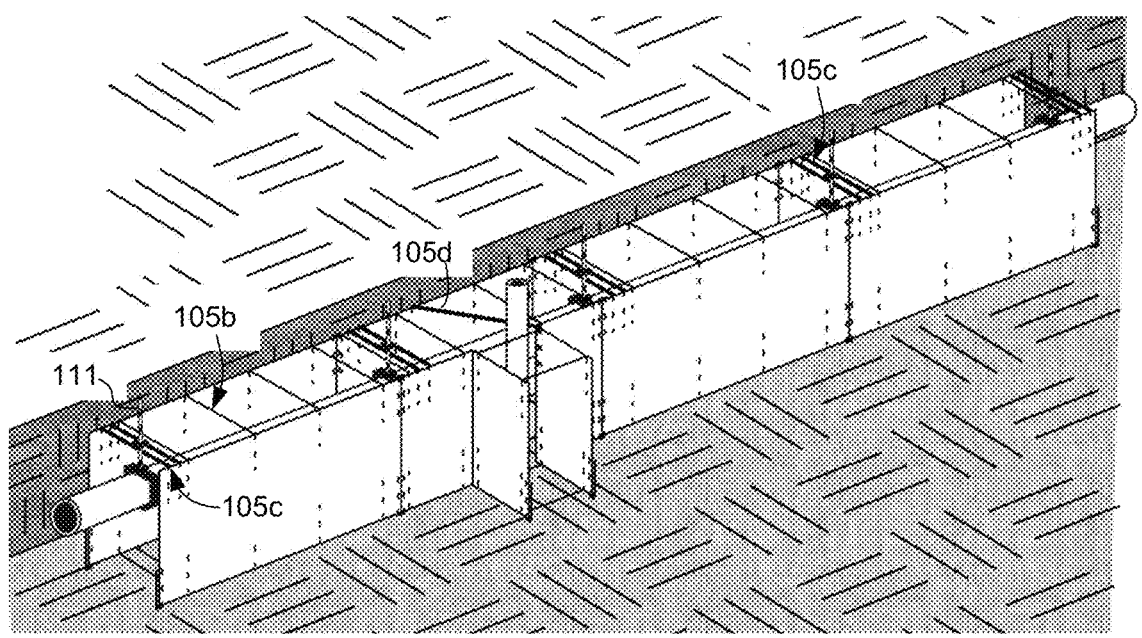
Figure 17:
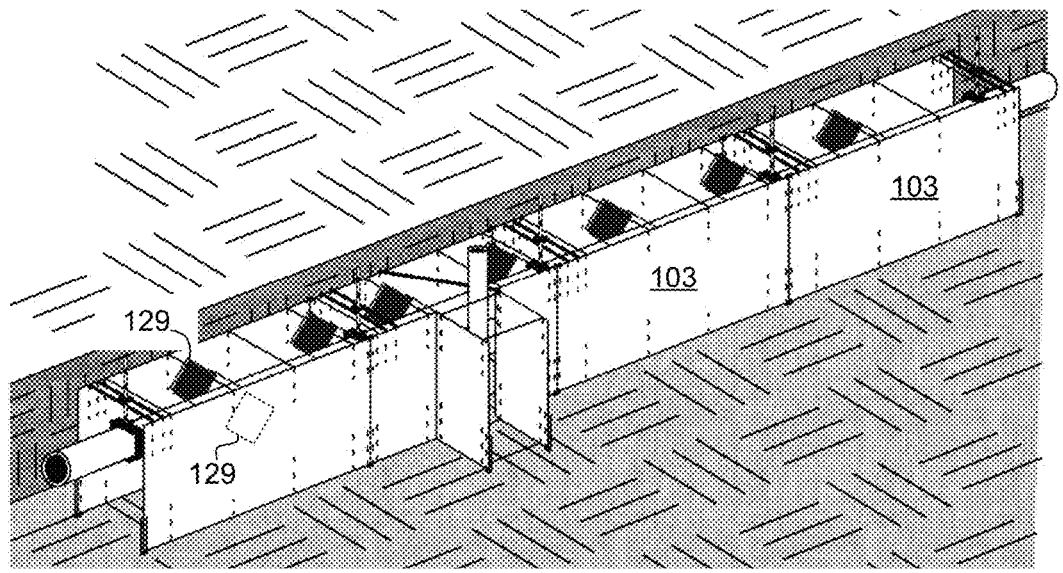

Finally in FIG. 12, another panel section is included to form the initial routing. At this stage, when the routing is completed, utility lines may be added (see FIG. 13). These lines are run/placed within the gap between panel sections. Naturally, the type of utility lines may dictate the how, where, and in what manner they are located within the gap. For purposes of explanation, unit 101 is shown with plumbing lines. Unit 101 may include a hanger 109 and a threaded rod 111 for the locating of plumbing lines. Hanger 109 and corresponding rods 111 are spaced as needed along the length of the plumbing lines. An exemplary distance of spacing may be that of four feet.

Corresponding connectors 105 are located along the top surface of panels 103/103b in a manner and spacing similar to that described previously (see FIG. 14). Ideally it is conceived that the spacing would be approximately 12" on center, however the precise spacing requirements may depend on design constraints and environmental considerations. At this stage, connectors 105 are located along the top surface and the bottom surfaces of panels 103. They are also located at the abutting ends of each panel. By laying the utility lines prior to locating the top layer of connectors, it is easier for a worker to maneuver and operate.

The plumbing lines are needing to be located and/or suspended within the gap of panels 103. Additional connectors 105c are located across panels 103 and on either side of rod 111 (see FIGS. 15 and 16). Connectors 105c are similar in form and function to that of connectors 105b. System 113 is in threaded communication with rod 111 and is configured to rest on top of connectors 105c. The elevation of hanger 109 at each rod 111 is set by adjusting the amount of rod 111 that is threaded above and below system 113. Therefore, by extending more of rod 111 above panels 103, less is left within the gap. Although is it known that system 113 may take many types of forms, a simplistic configuration would be that of a single nut fastener and a washer. The washer would be configured to extend out away from rod 111 sufficiently to overlap connectors 105c. The fastener would permit the relative adjustment of rod 111, with the washers supporting the weight of the plumbing lines across connectors 105c. System 113 is configured to temporarily locate and support the plumbing lines until the top end of rod 111 is secured within the substrate. Manipulation of each rod 111 within the routing allows workers to set a proper slope in the plumbing lines. Another feature to note is the use of connector 105d. Connector 105d is similar in form and function to that of connectors 105b except that the bridge portion is extended to permit a non-perpendicular alignment to panels 103.

Upon completion of unit 101, the soil will be backfilled against panels 103. Unit 101 may further include a retainer spacer 129 in communication with parallel panels on directly opposing sides of the gap (see FIG. 17). Spacer 129 is configured to provide additional lateral support against stress induced flexure of panels 103 from the backfill of soil and potential subsequent expansion of said soil. Spacer 129 is made of similar material and structure as that of panel 103. Slots similar to slots 127 are present and configured to accept one or more connectors. Spacer 129 is adhered to an interior surface 121 of panels 103. A connector similar to that of connectors 105b are inserted into spacers 129 on corresponding sides of panels 103 (across the gap). Spacers 129 are typically installed after the locating of the utility lines so as not to interfere or cause an obstruction. The particular shape of spacers 129 are not herein limited to that which is depicted.

Figure 18:
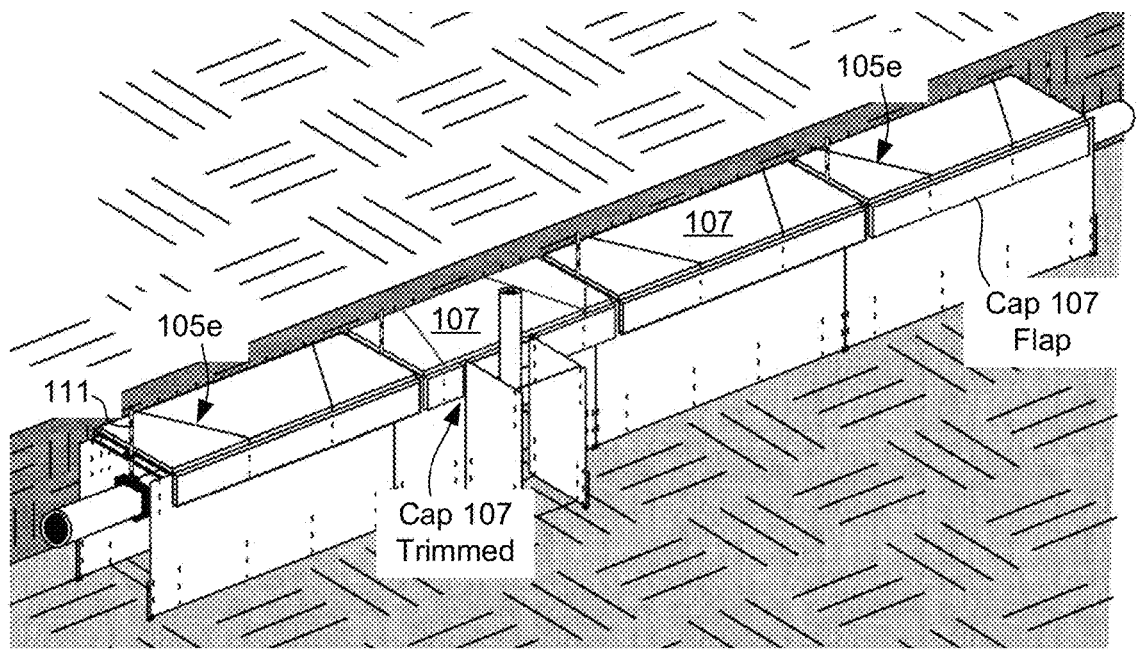
Figure 19:
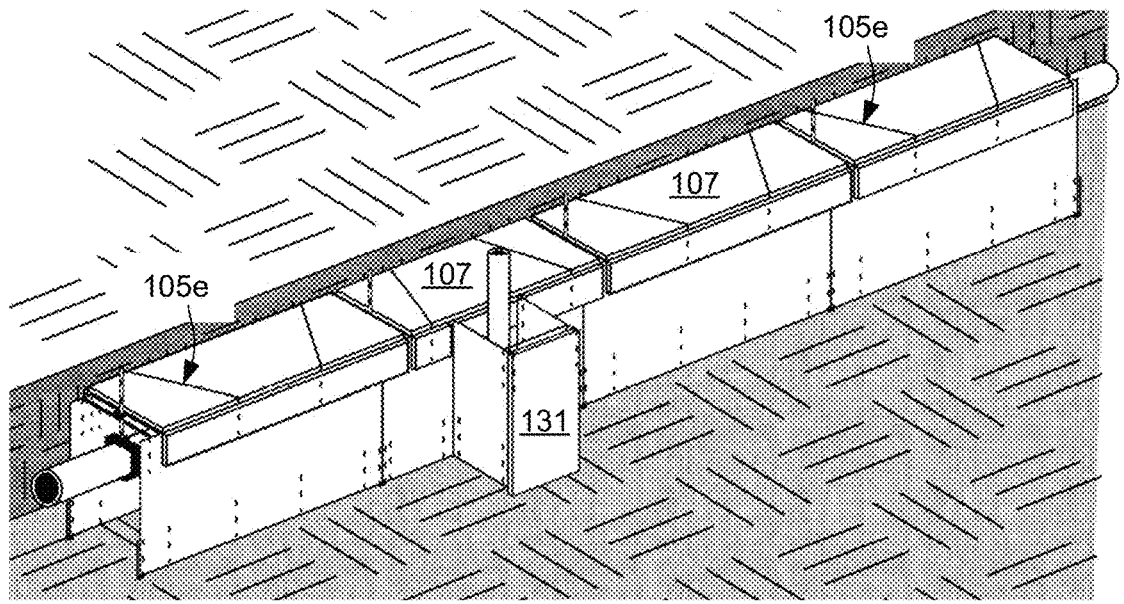

In FIG. 18, unit 101 is illustrated with the inclusion of a top cap 107. Cap 107 is configured to overlay across the tops of panels 103/103b. Cap 107 extends between rods 111, such that rods 111 pass beyond cap 107 without the need to puncture cap 107. Cap 107 is formed by taking a panel 103 and aligning the slots within the panel in a crosswise (side to side) orientation. Cap 107 may be scored in a manner to allow a portion of cap 107 to fold over and along the exterior surface 121 of both panels 103. Connectors 105e are included over the top of cap 107 and are configured to pass through a portion of the scored flap sections. If the slot orientation is crosswise, the slots would be oriented in a vertical manner ready to accept connectors 105e. Connectors 105e are similar in form and function to that of connectors 105b. At intersection points, it may be necessary to trim portions of cap 107 to accommodate the inclusion of route branches. FIG. 19 shows the inclusion of an end cap 131 adjacent panels 103b. End caps 131 are used to seal off open ends of each route to prevent soil from entering the void space.

Figure 20:
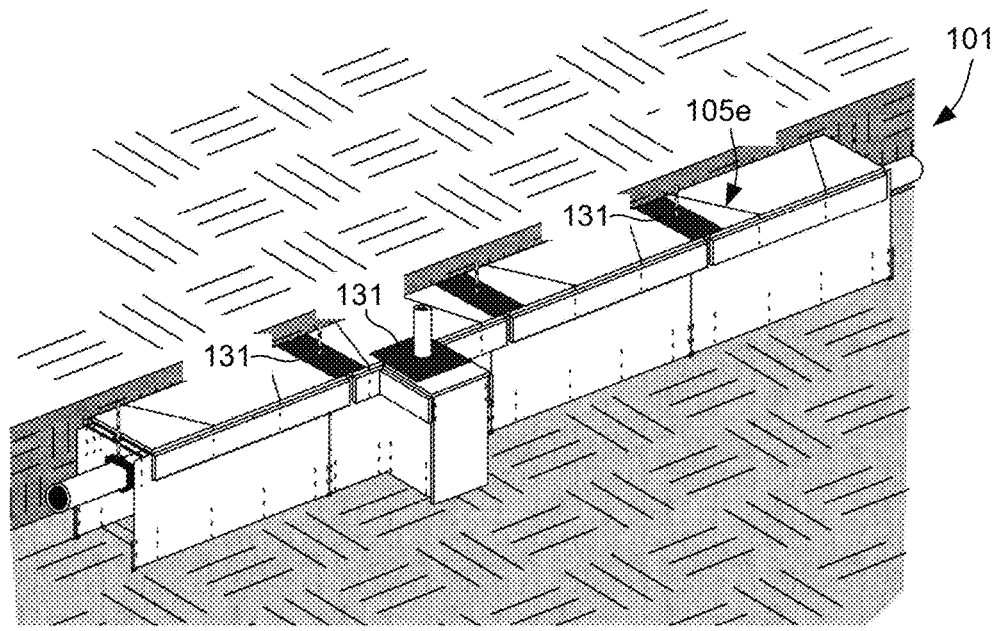
Figure 21:
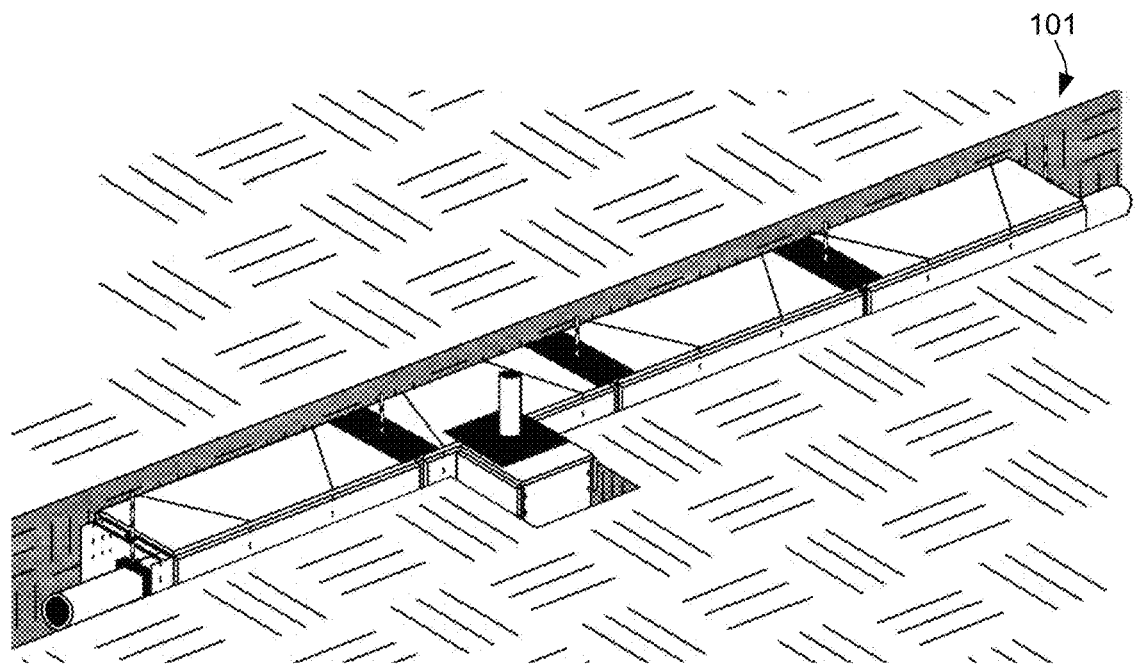
Figure 22:
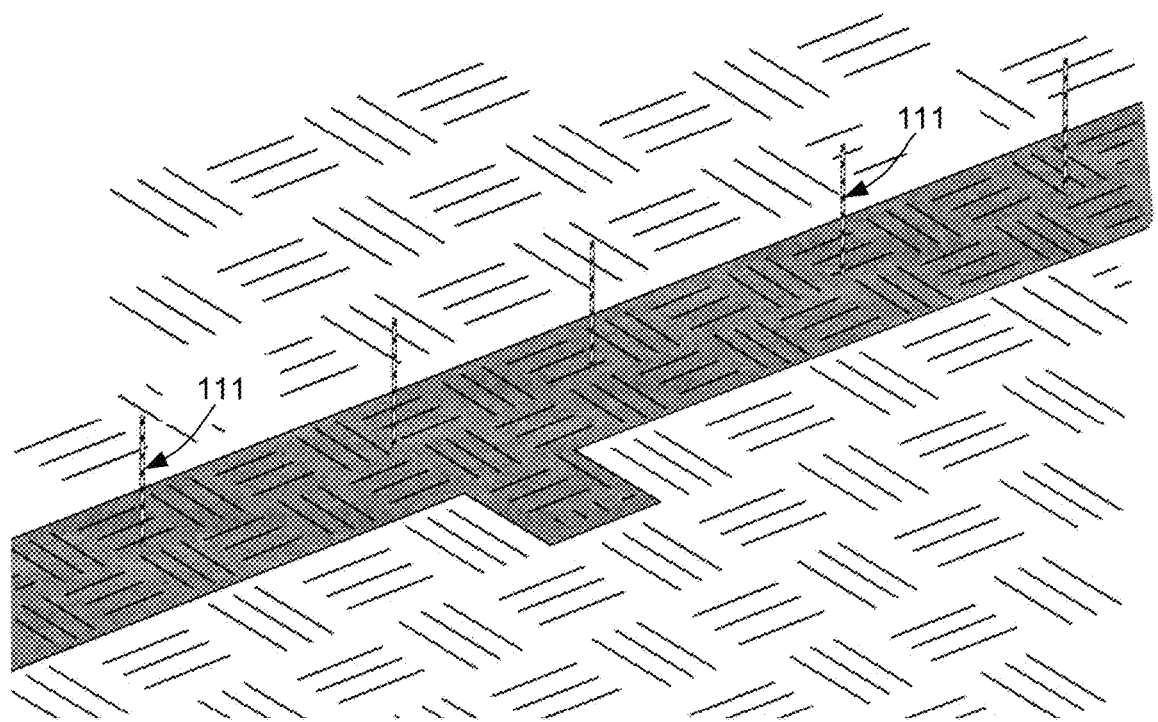

In particular to FIG. 20, a seam pad is illustrated. Unit 101 may further include the use of a seam pad 133. Pads 133 pass around rods 111 and overlap the joints of caps 107. Additionally, pads 133 are trimmed to wrap around any piping that may extend above caps 107. In FIG. 21, once unit 101 is constructed, the soil is backfilled into the trench. The soil covers a portion of unit 101. Ideally in most circumstances it is conceived that the backfill of soil will cover all of unit 101 except the extension of rods 111, which will rise above the soil surface (see FIG. 22).

Referring again to FIG. 2 in the drawings, rod 111 extends above the surface of the soil and is configured to couple to or within the substrate 115. The substrate provides the final secure holding of rod 111 and therefore the plumbing lines within the void space located between panels 103 and cap 107. System 113 is still operative at this time. System 113 is configured to flex under stresses induced by soil expansion so as to minimize the transfer of stress loads to the plumbing line. As soil expands, it may shift unit 101. System 113 is configured to traverse along the tops of connectors 105c with lateral load shifts. Additionally, the washer is configured to flex or bend as soil induces a vertical load upwards on unit 101. The composition of the washer is such that flexure is induces under particular loading. Under extreme conditions, the flexure of system 113 is sufficient to result in the washer passing between connectors 105c. This avoids rod 111 being loaded in a manner that would alter the slope of the plumbing lines.

Figure 23:
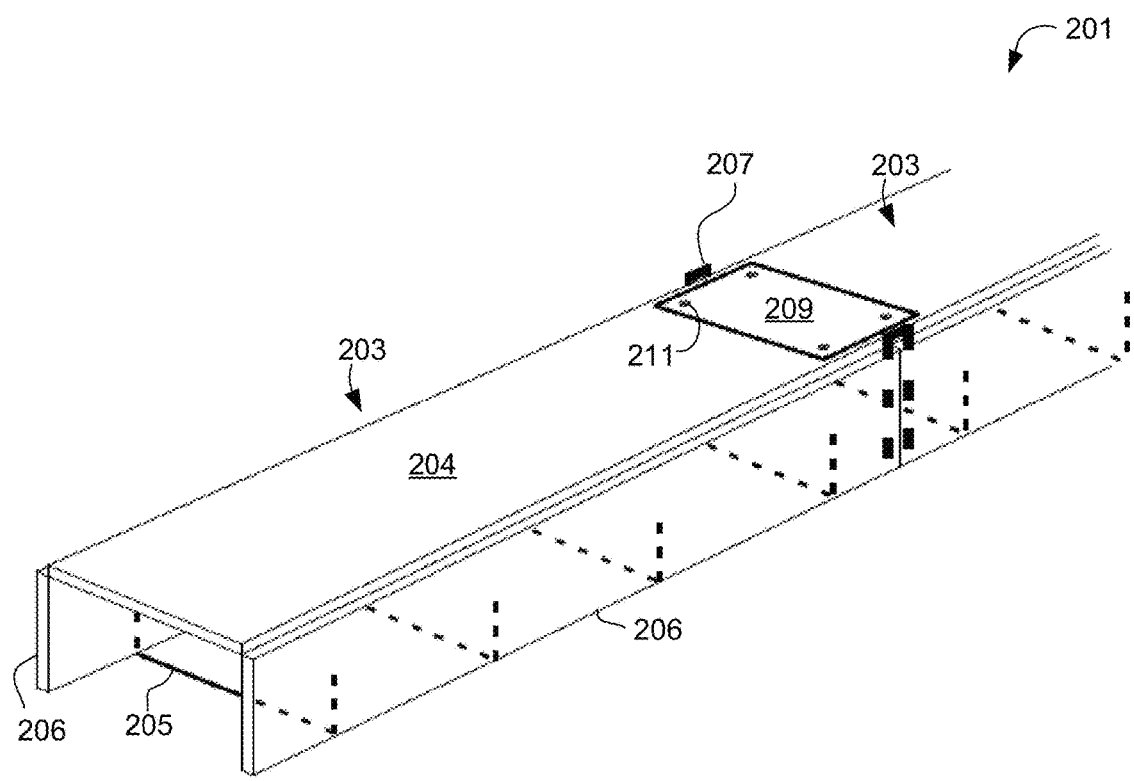
FIG. 23 is a perspective view of an alternate embodiment of the plumbing void construction unit of FIG. 1.
Figure 24:
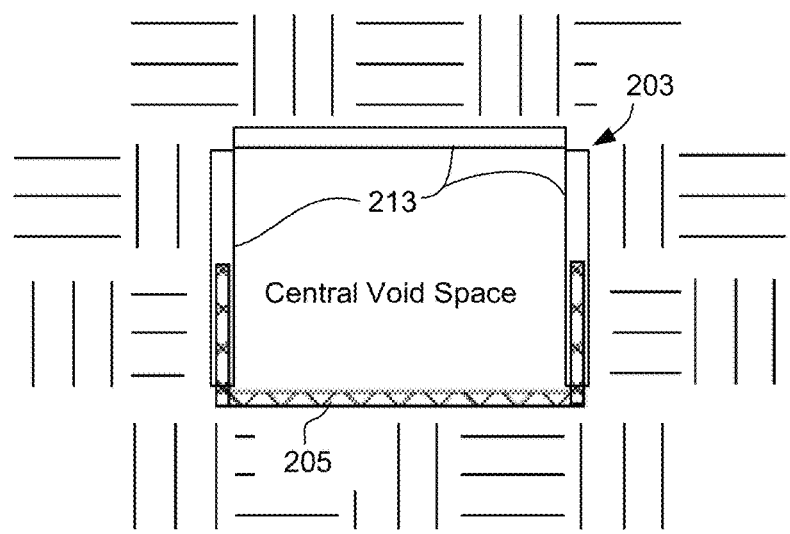
FIG. 24 is an exemplary front view of the plumbing void construction unit of FIG. 23.

Referring now also to FIGS. 23 and 24 in the drawings, an alternative embodiment of the plumbing void construction unit 101 is provided. FIG. 23 illustrates an alternative embodiment noted as being plumbing void construction unit 201. Unit 201 is similar in form and function to that of unit 101 except as herein indicated. As seen in FIG. 23, a sample configuration for a plumbing void construction unit 201 is shown. Unit 201 is configured to be located below ground level within a trench. Unit 201 is configured to provide a modular and fully customizable routing void space below ground level in which to run any number of utility lines, such as plumbing lines, electrical lines, gas lines and so forth. Unit 201 is configured to provide a fully enclosed space designed to withstand soil pressures. Unit 201 is also configured to protect the utility lines from expansive soil movements.

In FIG. 24, a front view looking down the length of unit 201 is illustrated. Unit 201 is formed and combined with other units to generate a routing or run. Unit 201 includes a singular panel member 203 which is used to form the top portion 204 and side portion 206 of the routing. Top portion 204 and side portions 206 form a continuous surface extending along the interior of the void space. Neighboring panel members 203 are coupled together through one or more braces/connectors 207. A series or plurality of lower supports 205 are configured to engage side portions 206 to maintain rigidity of the structure from the side forces as backfill is introduced into the trench. The combination of panels 203 in communication with one another form a channel for the laying of piping. It is understood that any type of lines may be run within the void space generated by unit 201. For purposes of explanation, reference will be given to that of plumbing lines and associated piping.

Unit 201 further includes a seam pad 209 is included to cover the gap between neighboring panel members 203 along the top portion 204. These may be secured to top portion 204 with one or more fasteners 211 that either puncture through pad 209 or lay across pad 209. The panels 203 along with supports 205 and seam pad 209 are configured to resist inward movement of the soil into the void space. A seam pad 209 is also included to cover the gap between neighboring panels 103 along the top of the panels. The seam pad 209 may be secured to the top surface via any number of fasteners, As an alternative to fasteners 211, adhesives or other boding agents may be used to secure seam pad 209 to panel 203. Seam pad 209 is made from a similar material to that of panel 203.

As seen in FIG. 24, panel member 203 is located within the ground and surrounded by backfill or soil when fully assembled. Initially unit 201 is located within a trench for assembly purposes. Support 205 is shown extending beneath portions 206 as it extends between the pair of portions 206. Supports 205 are similar to that of connector 105b in unit 101. A horizontal section of support 205 extends between portions 206 while a relatively vertical section extends upward and passes internally through the opposing portions 206. Support 205 prevents portions 206 from collapsing into the central defined void space. Supports 205 may be a metallic rigid member such as a rebar of appropriate sizing.

Also seen in FIG. 24 is that panel members 203 have an interior surface 213 that extends continuously from each portion 206 to top portion 204. It is understood that unit 201 may include the use of hanger 109, rod 111, and fastener system 113 as noted with unit 101 for purposes of routing the utility lines within the void space.

Figure 25:
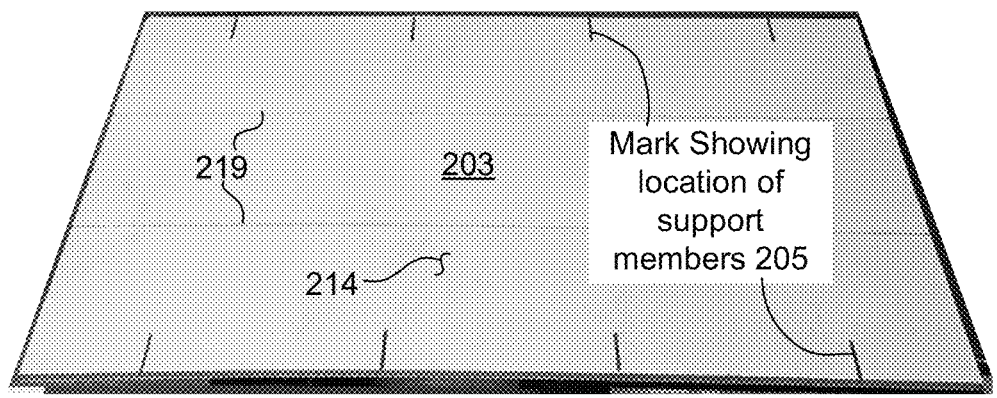
FIG. 25 is a perspective view of a panel member in the plumbing void construction unit of FIG. 23, prior to assembly.
Figure 26:
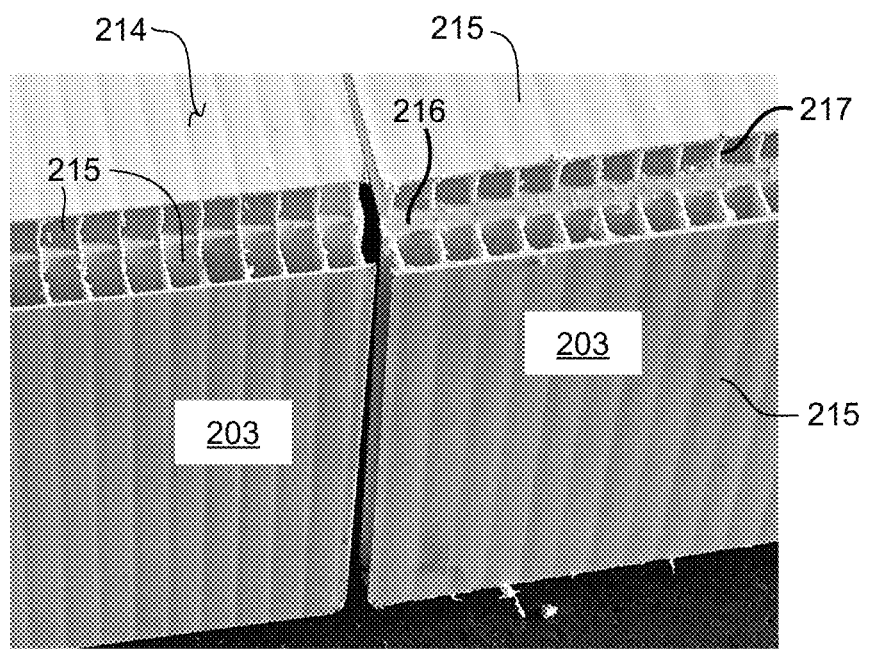
FIG. 26 is an enlarged view of a series of flutes within the panel member of FIG. 25.

Referring now also to FIGS. 25 and 26 in the drawings. Panel members 203 are formed from a product comprised of polypropylene plastic arrayed in a sheet of various sizing. Panels 203 may be found in different sizing sufficient to produce a void structure ranging from a height of portions 206 being that of 12-18 inches and width along top portion 204 being approximately 18-36 inches for example. Each panel member 203 is ideally in length approximately 48" for example. Panels 203 are manufactured as a ribbed plastic panel having a series of aligned flutes 213 that run the length/width of the panel.

As seen in FIG. 25, unit 201 is a unique product that is designed to be constructed of a limited number of components and yet be configured to withstand all lateral and vertical pressures that are applied to it when buried during a backfill process. The minimal number of components allow unit 201 to be easily transported in a broken down condition to save space and increase portability. Unit 201 is depicted in a manner wherein the panel 203 is scored and folded partially to form a three-sided channel. Supports 205 are engaged within the panel 203 to maintain the orientation of portions 206. Multiple panel sections may be combined together.

Each panel 203 is provided and shipped to the site as a flat sheet of material (see FIG. 25). Panel 203 has an upper surface 214 and a lower surface 216. Panel member 203 is arrayed with a series of flutes 215 (see FIG. 26) that have a defined orientation and are formed between surfaces 214 and 216. Each flute 215 is linear and is defined by the inclusion of perpendicular walls 217 connecting the exterior surfaces 214 and 216. In order to form the void structure with a top portion and side portions, an operator scores upper surface 214 of panel 203 so as to cut through surface 214 and at least a portion of walls 217. Lower surface 216 is retained without cutting. Score lines 219 are configured to run across flutes 215 in a perpendicular manner such that when folded, the flutes 215 are exposed. Use of two score lines permits panel 203 to be formed into a U-shaped structure having 2 side portions and a top portion. Lower surface 216 retains the connection between portion 206 and top portion 204. Interior surface 213 is the retained lower surface 216 after scoring is performed. It is understood that the location of score lines 219 are chosen in accordance with the sizing needs of the void space. This location also affects the sizing of portions 204 and 206.

FIG. 26 provides an enlarged view of the flutes 215 of panel Each flute 215 is a hollowed channel that runs the full dimension of panel 203. These flutes 215 add rigidity and also help to minimize weight and material. In order to maintain its orientation in the U-shape, a number of supports 205 are located beneath and through the sides of panel 203. Supports 205 are configured to pass internally through flutes 215. The support members 205 extend upwards a selected distance into the flutes 215 of each portion 206. There is no restriction on the specific amount of length of support member 205 that needs to be inserted into the side portions 206. It is important that the size of support members 205 be sized sufficiently small enough that they fit within the flutes 215 without compromising the structure of the panels. Some resistance will be ideally created between them. Frictional resistance helps to maintain the position of the support members such that they do not fall out of the panel's flutes.

Figure 27:
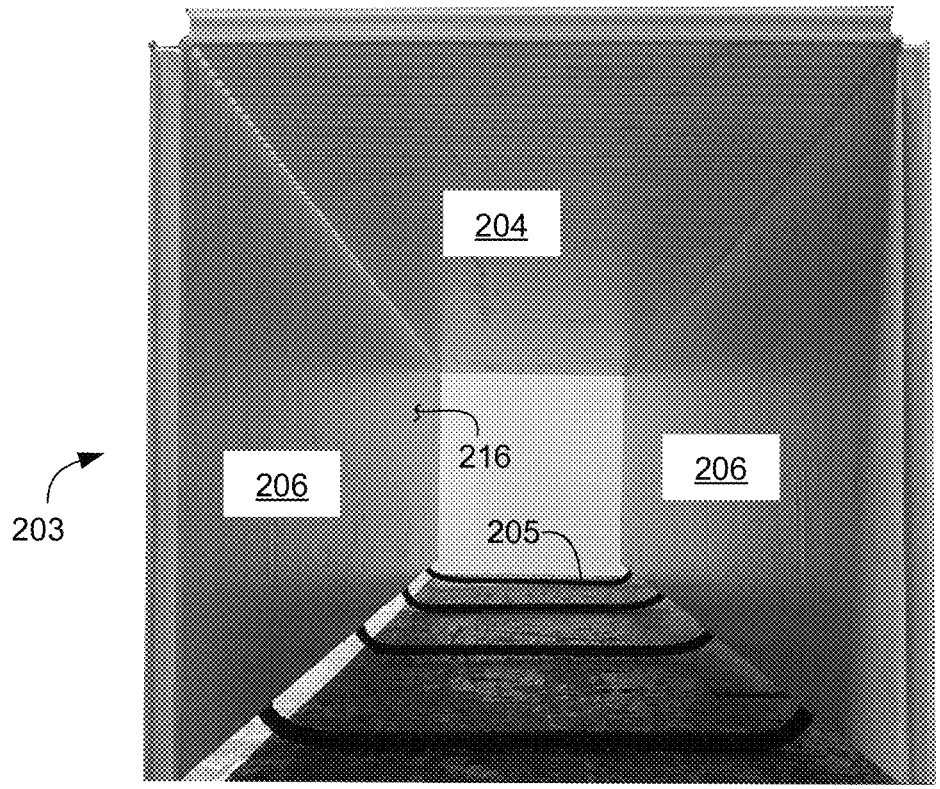
FIG. 27 is a front view of the panel member of FIG. 25 formed to define a void space.

Referring now also to FIG. 27 in the drawings, a front view of unit 201 is depicted with panel 203 formed in the U-shaped structure. Supports 205 are seen at the bottom between portions 206. Upper surface 214 is shown scored or cut with lower surface 216 uncut and holding portions 204 and 206 together, similar to a membrane.

Figure 28:
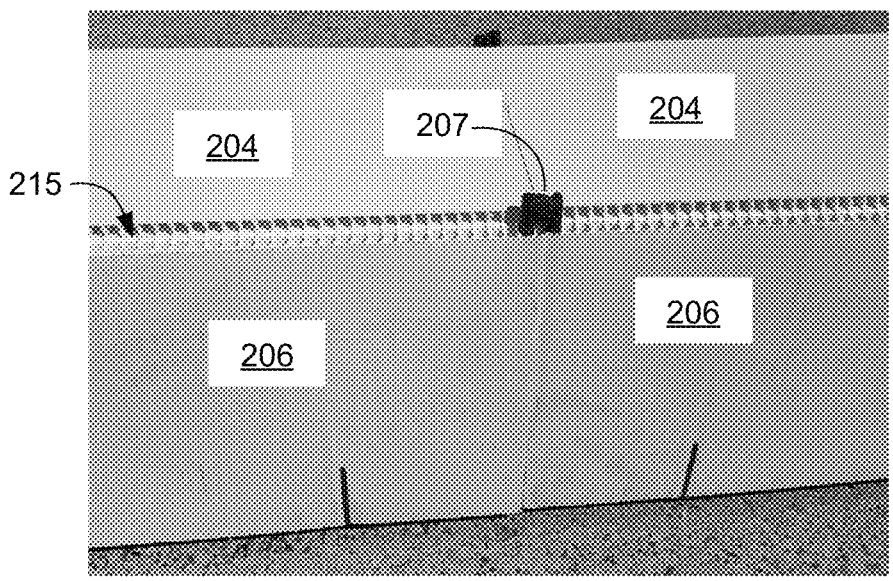
FIG. 28 is a perspective view of an attachment member within the plumbing void construction unit of FIG. 23 joining two adjacent panel members.

Referring now also to FIG. 28 in the drawings, a perspective view of two neighboring panel members 203 are illustrated. Connectors 207 are inserted along the vertical sides of panel 203 adjacent the respective edges of the neighboring panels. These are inserted through flutes 215 similarly to that of supports 205. Connectors 207 are similar in form and function to connectors 105a/105b. As noted previously, neighboring units 201 may be aligned adjacent one another to create additional length. Connectors 207 are used and inserted into the vertical flutes 215 of the panel sides of neighboring units. Each connector 207 includes a plurality of vertical members and a cross member there between. These are also U-shaped. The cross member portion may be created via different methods. It is not imperative that the connector 207 remains flush with the top of panel 203.

In operation, the method of constructing is simplified over that of unit 101. Panels 203 are scored as needed across flutes 215 and folded about lower surface 216. This folding exposes flutes 215 for communication with connectors 207. Supports 205 are inserted into the flutes at the ends of portions 206. A series of panels 203 are aligned to form the routing and are coupled with connectors 207. Seam pads 209 are optionally located to cover the gaps between panels 203. It is understood that the hanger, rods, and fasteners system described with respect to unit 101 is equally usable with respect to and included optionally within unit 201. As the method of use and components are similar in form and function between units 201 and 101, further depiction and description was not made for unit 201.

It is common for plumbers or tradesman to provide their own supports for supporting and suspending plumbing, conduit, and other "lines" within the void space of unit 201. Unit 201 is configured to permit the selective passage of utility support devices through panel 203 in order to properly route utility lines. These support devices may include threaded rods holding brackets or clevises. These may be secured to panel 103 and/or also to any foundation above unit 201 and the soil.

One important feature worth noting at this stage is that, when fully constructed, unit 201 is likely to include portions along its constructed length that are below a concrete footing or slab. Often space exists between unit 201 and the slab eventually poured above. Locating the support devices in the foundation anchors them to a particular location and ensures the location and elevation of the utility lines. In the event of heaving or other soil expansion, such support devices could pull through panel 203 as it moves, but the lines remain constant as a result of the foundation anchoring it.

The current application has many advantages over the prior art including at least the following: 1) simplified packaging and transportation; 2) simplified customization; 3) prevents slab leak damage; (4) provides an area into which soil can expand; (5) temporarily supports under-slab plumbing; (6) secures and suspends lateral pipes; (7) provides containment; and (8) eliminates potential damage to pipes, electrical lines, conduit, other plumbing apparatuses and adjacent structures.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A construction unit for the formation of a void space, comprising:
    a plurality of panels aligned adjacent one another, the plurality of panels having a lower surface and an upper surface, the upper surface being scored along a score line and the lower surface being uncut;
    a plurality of flutes defined within the plurality of panels between the upper surface and the lower surface, the plurality of panels folded at the score line about the lower surface;
    a support extending internally within the flutes of a singular panel of the plurality of panels, the support extending across the void space passing within the flutes on opposing ends of the singular panel of the plurality of panels; and
    a connector configured to interlock the plurality of panels together, the connector passing internally within the flutes of adjacent panels of the plurality of panels;
    wherein the void space is formed for the protection of utility lines from soil expansion.

2. The construction unit of claim 1, further comprising:
    a hanger configured to couple around a portion of a plumbing line.

3. The construction unit of claim 2, further comprising:
a threaded rod configured to protrude from the void space and past a top portion of at least one of the plurality of panels, the threaded rod configured to elevate the hanger at a desired elevation.

4. The construction unit of claim 3, further comprising:
a fastener system configured to communicate with the threaded rod and locate the threaded rod adjacent the top portion.

5. The construction unit of claim 3, wherein the slope of the plumbing line is dependent upon the length of the threaded rod within the void space.

6. The construction unit of claim 1, further comprising:
a threaded rod configured to protrude from the void space and past a top portion of at least one of the plurality of panels, the threaded rod configured to elevate a plumbing line.

7. The construction unit of claim 6, further comprising: a fastener system configured to communicate with the threaded rod and locate the threaded rod adjacent the top portion.

8. The construction unit of claim 7, wherein the fastener system is configured to flex under stresses induced by soil expansion so as to minimize the transfer of stress loads to the plumbing line.

9. The construction unit of claim 1, further comprising:
a seam pad coupled to a portion of the plurality of panels so as to cover a gap between the plurality of panels.

10. The construction unit of claim 1, wherein the connector is configured to couple adjacent panels abutting each other.

11. The construction unit of claim 1, wherein the connector is configured to couple panels across the void space from one another.

12. The construction unit of claim 1, wherein the connector is configured to traverse within the flutes located inside the plurality of panels.

13. A method of protecting utility lines from the effects of expansive soil, comprising:
obtaining a first panel member;
scoring the first panel member across a plurality of internal flutes to create a folding joint, the scoring configured to cut an upper surface of the first panel member, a lower surface of the first panel member being unscored;
folding over a portion of the first panel member about the folding joint to form a defined central volume;
inserting a support between opposing ends of the first panel member through the flutes, the support extending across the void space;
abutting a secondary panel member adjacent the first panel member;
coupling the panel members together with one or more connectors; and
aligning the panel members so as to create a route;
wherein the route defines a void space for the passage of the utility lines.

14. The method of claim 13, further comprising:
laying utility lines within the route defined by the panel members.

15. The method of claim 14, further comprising:
elevating the utility lines by suspending them from a threaded rod in communication with at least one of the panel members.

16. The method of claim 15, further comprising:
adjusting the slope of the utility lines.

17. The method of claim 13, further comprising:
installing a seam pad to cover gaps between the first panel member and the second panel member.

18. The method of claim 13, further comprising:
backfilling soil around the panel members such that at least a portion of the panel members is below ground level.

* * * * *